(12) United States Patent
Futaki et al.

(10) Patent No.: US 12,120,767 B2
(45) Date of Patent: Oct. 15, 2024

(54) RADIO TERMINAL, BASE STATION, AND METHODS AND NON-TRANSITORY COMPUTER-READABLE MEDIA THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/854,698

(22) Filed: Jun. 30, 2022

(65) Prior Publication Data

US 2022/0338297 A1 Oct. 20, 2022

Related U.S. Application Data

(63) Continuation of application No. 17/060,423, filed on Oct. 1, 2020, now Pat. No. 11,425,780, which is a (Continued)

(30) Foreign Application Priority Data

Jan. 5, 2017 (JP) .................................. 2017-000801

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0016* (2013.01); *H04W 36/0072* (2013.01);
(Continued)

(58) Field of Classification Search
CPC . H04W 76/27; H04W 72/51; H04W 36/0016; H04W 36/0072; H04W 36/36; H04W 68/02
See application file for complete search history.

(56) References Cited

U.S. PATENT DOCUMENTS 9,504,081 B2   11/2016   Anderson  ............. H04W 76/19
9,788,250 B2   10/2017   Nagasaka  .............. H04H 20/38
(Continued)

FOREIGN PATENT DOCUMENTS

CN   102413573 A   4/2012
CN   104620664 A   5/2015
(Continued)

OTHER PUBLICATIONS

Chinese Office Action for CN Application No. 201780087971.6 mailed on Aug. 26, 2022 with English Translation.
(Continued)

*Primary Examiner* — Chandrahas B Patel
(74) *Attorney, Agent, or Firm* — Sughrue Mion, PLLC

(57) ABSTRACT

A radio terminal (2) controls state transitions of the radio terminal (2) among first to third RRC states. In addition, if the radio terminal (2) is in the second RRC state, if a current cell that the radio terminal (2) has camped on is different from a first cell in which a state transition from the first RRC state to the second RRC state was performed, and if the current cell satisfies a predetermined condition, the radio terminal (2) allows the radio terminal (2) to transmit data to be transmitted in the current cell by a first transmission procedure in which the radio terminal (2) transmits uplink data before entering the first RRC state.

11 Claims, 10 Drawing Sheets

Related U.S. Application Data continuation of application No. 16/475,722, filed as application No. PCT/JP2017/041833 on Nov. 21, 2017, now Pat. No. 10,863,575.

(51) Int. Cl.
  *H04W 36/36* (2009.01)
  *H04W 68/02* (2009.01)
  *H04W 72/51* (2023.01)
(52) U.S. Cl.
  CPC ........... *H04W 36/36* (2013.01); *H04W 68/02* (2013.01); *H04W 72/51* (2023.01)

(56) References Cited

U.S. PATENT DOCUMENTS

| | | | | |
|---|---|---|---|---|
| 10,129,802 | B2* | 11/2018 | Pelletier | ................ H04W 76/15 |
| 2012/0281566 | A1 | 11/2012 | Pelletier et al. | |
| 2016/0309379 | A1 | 10/2016 | Pelletier et al. | |
| 2017/0071021 | A1 | 3/2017 | Jin et al. | |
| 2018/0359662 | A1 | 12/2018 | Kim | .................... H04L 65/1016 |
| 2019/0141669 | A1* | 5/2019 | Hong | .................. H04W 68/005 |

FOREIGN PATENT DOCUMENTS

| | | |
|---|---|---|
| CN | 105940695 A | 9/2016 |
| JP | 5525620 B2 | 6/2014 |
| WO | 2008/041816 A1 | 4/2008 |
| WO | 2009/046662 A1 | 4/2009 |
| WO | 2016/163112 A1 | 10/2016 |

OTHER PUBLICATIONS

Intel Corporation, "Data transfer from NR_RRC_INACTIVE", 3GPP TSG RAN WG2 Meeting #96, R2-188522. Nov. 14-18, 2016, 5 pgs., Reno, USA.
NTT Docomo, Inc.: "Text Proposal to TR 36.804 on UE states and state transitions for NR", 3GPP TSG-RAN WG2 #96, R2-168856, Dec. 6, 2016, (2 pages total).
"3rd Generation Partnership Project: Technical Specification Group Services and System Aspects; Study on Architecture for Next Generation System (Release 14)", 3GPP TR 23.799 V14.0.0, Dec. 2016, pp. 1-522.
NT Docomo, Inc., "UE state transition diagram for NR", 3GPP TSG-RAN WG2 #96, R2-16807 Revision of R2-167136, Nov. 16-18, 2016, pp. 1-7, Reno, USA.
CMCC; "UE states in NR", 3GPP TSG-RAN WG2 Meeting #95bis, R2-167070, Oct. 9, 2016, (6 pages total).
Huawei et al., "UL data transmission in RRC_INACTIVE", 3GPP TSG-RAN WG2 #96. R2-188544, Nov. 14-18, 2016, pp. 1-8, Reno, Nevada, USA.
International Search Report for PCT/JP2017/041833 dated Feb. 13, 2018 (PCT/ISA/210).
Communication dated Oct. 11, 2019, from the European Patent Office in application No. 17890553.5.
Ericsson, "Baseline solution for small data transmission in RRC_INACTIVE", 3GPP TSG-RAN WG2 #98, Tooc R2-168713, Nov. 14-18, 2016, Reno, Nevada, USA.
OPPO: "Discussion on Efficient Small Data transmission in "Inactive" State", 3GPP TSG-RAN WG2 Meeting #96bis; R2-166187, Oct. 1, 2016, (5 pages total).
Communication dated Nov. 2, 2020. Issued by the Intellectual Property Office of India in application No. 201917026685.
Japanese Office Action for JP Application No. 2018-560334 mailed on May 25, 2021 with English Translation.
Huawei, HiSilicon, "State transactions", 3GPP TSG RAN WG2 #96, R2-168560, Nov. 14, 2016, USA.
ZTE, ZTE Microelectronics, "Consideration on the RAN based notification in RRC_INACTIVE", 3GPP TSG RAN WG2 #96, R2-167848, Nov. 14, 2016, USA.
Japanese Office Communication for JP Application No. 2020-195021 mailed on Feb. 1, 2022 with English Translation.
Ericsson, "Small data transmission for inactive UEs", 3GPP TSG-RAN WG2 #95bis, R2-166922, Kaohsiung, Taiwan, Oct. 10, 2016, pp. 1-7.
Japanese Office Action for JP Application No. 2022-146995, mailed on Feb. 7, 2023 with English Translation.
LG Electronics Inc., "UE dedicated on-demand SI delivery in New RAT", 3GPP TSG RAN WG2 #96, R2-168416, Nov. 5, 2016.
CN Office Action for CN Application No. 201780087971.6, mailed on Jul. 19, 2023 with English Translation.
Huawei et al., "Data transmission in amp;quot;low activity state amp;quot;" 3GPP tsg_ran / WG2_RL2,TSGR2_95 bis, R2-166284, Oct. 1, 2016 , pp. 1-11., Kaohsiung.
ETSI MCC, "Draft Report v1.0 for RAN2 #95bis in Kaohsiung, Oct. 10-Oct. 14, 2016", 3GPP tsg_ran / WG2_RL2, TSGR2_95 bis R2-167461, Nov. 19, 2016, pp. 1-195., Reno, Nevada, USA.
Ericsson, "CN and RAN interactions for RRC_INACTIVE UEs", 3GPP tsg_ran / WG2_RL2, R2-168710, Nov. 5, 2016, pp. 1-4., Reno, Nevada, USA.
Huawei et al., "Inactive UE inter-RAT mobility", 3GPP tsg_ran / WG2_RL2, TSGR2_95 R2-167007, Oct. 1, 2016, pp. 1-2., Kaohsiung.
CN Office Action for CN Application No. 201780087971.6, mailed on Apr. 6, 2023 with English Translation.
LG Electronics, Inc., "UE controlled mobility in RRC_INACTIVE", 3GPP TSG-RAN WG2 #96, R2-168420, Aug. 18, 2016.

\* cited by examiner

RADIO TERMINAL, BASE STATION, AND METHODS AND NON-TRANSITORY COMPUTER-READABLE MEDIA THEREFOR

CROSS-REFERENCE TO RELATED APPLICATIONS

The present application is a continuation application of U.S. patent application Ser. No. 17/060,423 filed on Oct. 1, 2020, which is a continuation application of U.S. patent application Ser. No. 16/475,722 filed on Jul. 3, 2019, which issued as U.S. Pat. No. 10,863,575, which is a National Stage Entry of international application PCT/JP2017/041833 filed on Nov. 21, 2017, which claims the benefit of priority from Japanese Patent Application No. 2017-000801 filed on Jan. 5, 2017, the disclosures of all of which are incorporated in their entirety by reference herein.

TECHNICAL FIELD

The present disclosure relates to a radio communication system and, in particular, to transmission control in a radio terminal.

BACKGROUND ART

The 3rd Generation Partnership Project (3GPP) has started in 2016 the standardization for the fifth generation mobile communication system (5G), i.e., 3GPP Release 14, to make it a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. An SDF is one or more packet flows that match an SDF template (i.e., packet filters) based on a Policy and Charging Control (PCC) rule. In order to achieve packet routing, each packet to be transferred through an EPS bearer contains information for identifying which bearer (i.e., General Packet Radio Service (GPRS) Tunneling Protocol (GTP) tunnel) the packet is associated with.

In contrast, with regard to the 5G System, it is discussed that although radio bearers may be used in the 5G-RAN, no bearers are used in the 5G-CN or in the interface between the 5G-CN and the NG-RAN (see Non-Patent Literature 1). Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. That is, the 5G System adopts the Flow-based QoS (or per-flow QoS) concept instead of the Bearer-based QoS concept. In the Flow-based QoS concept, QoS is handled per PDU flow. The PDU flow is also referred to as a QoS flow accordingly. Association between a 5G UE and a data network is referred to as a "PDU session". The term "PDU session" corresponds to the term "PDN connection" in LTE and LTE-Advanced. A plurality of PDU flows (or QoS flows) can be configured in one PDU session.

It has also been suggested that the 5G System supports network slicing (see Non Patent Literature 1). Network slicing uses Network Function Virtualization (NFV) and software-defined networking (SDN) techniques and makes it possible to create a plurality of virtualized logical networks on a physical network. Each virtualized logical network is referred to as a network slice or a network slice instance, includes logical nodes and functions, and is used for specific traffic and signaling. The 5G-RAN or the 5G-CN or both have a Slice Selection Function (SSF). The SSF selects one or more network slices suitable for a 5G UE based on information provided by at least one of the 5G UE and the 5G-CN.

FIG. 1 shows a basic architecture of the 5G system. A UE establishes one or more Signalling Radio Bearers (SRBs) and one or more Data Radio Bearers (DRBs) with a gNB. The 5G-CN and the gNB establish a control plane interface and a user plane interface for the UE. The control plane interface between the 5G-CN and the gNB (i.e., RAN) is referred to as an NG2 interface or an NG-c interface and is used for transfer of Non-Access Stratum (NAS) information and for transfer of control information between the 5G-CN and the gNB. The user plane interface between the 5G-CN and the gNB (i.e., RAN) is referred to as an NG3 interface or an NG-u interface and is used for transfer of packets of one or more PDU flows (or QoS flows) in a PDU session of the UE.

Furthermore, in the 5G System, a new RRC state is introduced in addition to the existing RRC_CONNECTED and RRC_IDLE states (see, for example, Non Patent Literature 1 to 5). The new RRC state is referred to as an RRC_INACTIVE state or an RRC_INACTIVE_CONNECTED state.

The RRC_CONNECTED and RRC_IDLE states of the 5G system have features similar to those of the RRC_CONNECTED and RRC_IDLE states of LTE, respectively. When the UE is in the RRC_CONNECTED state, the UE and the 5G-RAN maintain an AS context, and a location of the UE is known to the 5G-RAN at cell level. Mobility of the UE in the RRC_CONNECTED state is handled by a handover controlled by the 5G-RAN. On the other hand, when the UE is in the RRC_IDLE state, the UE and the 5G-RAN have released the AS context, the location of the UE is not known to the 5G-RAN, and the location of the UE is known to the 5G-CN at location registration area level. The location registration area corresponds to a Tracking Area (TA) of LTE. Mobility of the UE in the RRC_IDLE state is handled by cell reselection controlled by the UE. Moreover, the RRC state of the AS layer is associated with a connection management (NG Connection Management (NG CM)) state of the NAS layer. The UE in the RRC_CONNECTED state is considered to be in an NG-CM-CONNECTED state in the UE and the 5G-CN. In contrast, the UE in the RRC_IDLE state is considered to be in an NG-CM-IDLE state in the UE and the 5G-CN.

It can be said that the RRC_INACTIVE state is an intermediate state between the RRC_CONNECTED state and the RRC_IDLE state. Some features of the RRC_INACTIVE state are similar to those of the RRC_CONNECTED state, while some other features of the RRC_INACTIVE state are similar to those of the RRC_IDLE state.

When the UE is in the RRC_INACTIVE state, the UE and the 5G-RAN maintain at least part of the AS context. The AS context held by the UE and the 5G-RAN for the UE in the RRC_INACTIVE state includes, for example, a radio bearer configuration and an AS security context. Further, the 5G-RAN keeps the control-plane and user-plane connections (i.e., NG2 and NG3 interfaces in FIG. 1) with the 5G-CN for the UE in the RRC_INACTIVE state established. The UE in the RRC_INACTIVE state is considered to be in the NG-CM-CONNECTED state in the UE and the 5G-CN. Accordingly, the 5G-CN does not distinguish whether the UE is in the RRC_CONNECTED state or the RRC_INACTIVE state. These features of the RRC_INACTIVE state are similar to those of the RRC_CONNECTED state.

However, the mobility of the UE in the RRC_INACTIVE state is similar to that of the UE in the RRC_IDLE state. Specifically, the mobility of the UE in the RRC_INACTIVE state is handled by the cell reselection controlled by the UE.

FIG. 2 shows state transitions, which are currently proposed, between the three RRC states. The UE can transition from the RRC_CONNECTED state to the RRC_INACTIVE state and vice versa (Steps 201 and 202). It is assumed that the transition between the RRC_CONNECTED state and the RRC_INACTIVE state reuses the Suspend and Resume procedures of the RRC Connection defined for LTE in 3GPP Release 13. The AS context stored in the 5G-RAN for the UE in the RRC_INACTIVE state may be transferred between RAN nodes (i.e., gNBs). Specifically, when the UE transitions from the RRC_INACTIVE state to the RRC_CONNECTED state, the gNB which has received an RRC message (e.g., RRC Connection Resume request) from the UE may fetch or retrieve the AS context of this UE from another gNB.

The location of the UE in the RRC_INACTIVE state is known to the 5G-RAN at a level of a newly defined RAN Notification Area (RNA). The RAN notification area is also referred to as a RAN-based Notification Area, a RAN paging area, or a RAN location update area. The RAN notification area (RNA) includes one or more cells, is determined by the 5G-RAN, and is configured in the UE by the 5G-RAN. Even when the UE in the RRC_INACTIVE state moves between cells by cell reselection within the RAN notification area, there is no need to notify (or report to) the 5G-RAN that it has performed the cell reselection. The UE in the RRC_INACTIVE state requests the 5G-RAN to update the RAN notification area in response to reselecting a cell outside the RAN notification area.

FIG. 3 shows an example of the mobility of the UE in the RRC_INACTIVE state. First, a UE 301 is in the RRC_CONNECTED state (321) in a cell 351 of a gNB 311 and it has been assigned dedicated radio resources from the gNB 311 and has established dedicated radio bearers 322. Upon determining to move the UE 301 into the RRC_INACTIVE state, the gNB 311 configures the UE 301 with a RAN notification area 340 and transmits an RRC message (e.g., RRC Suspend message) to the UE 301 (323). In response to the instruction from the gNB 311, the UE 301 enters the RRC_INACTIVE state from the RRC_CONNECTED state (324).

The UE 301 in the RRC_INACTIVE state performs a cell reselection procedure and accordingly reselects a cell 352 of a gNB 312 (325). Since the cell 352 is included in the RAN notification area 340 configured in the UE 301, the UE 301 does not report the cell reselection (i.e., update of UE location information) to the 5G-RAN (e.g., cell 352 or gNB 312). The UE 301 further moves and reselects a cell 353 of a gNB 313 (326). The cell 353 is not included in the RAN notification area 340 configured in the UE 301, and accordingly the UE 301 transmits a request for a RAN notification area update (327) to the gNB 313. The request (327) may be transmitted using an RRC message (e.g., RRC Resume Request message) requesting a transition from RRC_INACTIVE to RRC_CONNECTED. The gNB 313 acquires an AS context of the UE 301 from the gNB 311 and re-establishes the Packet Data Convergence Protocol (PDCP) and Radio Link Control (RLC) for radio bearers using the acquired AS context. Then, the gNB 313 transmits an RRC message (e.g., RRC resume message) to move the UE 301 to the RRC_CONNECTED state. In response to the instruction from the gNB 311, the UE 301 enters the RRC_CONNECTED state from the RRC_INACTIVE state in the cell 353 (329). The UE 301 is able to transmit and receive data using dedicated radio bearers 330.

There are several proposals on uplink (UL) data transmission by a UE in the RRC_INACTIVE state. For example, Non-Patent Literatures 2 and 3 each propose a procedure in which a UE in the RRC_INACTIVE state transmits UL data without entering the RRC_CONNECTED state. Note that, the term "UL data" used in this specification means uplink user-plane data and does not include control-plane data, such as a Non-Access Stratum (NAS) message.

Specifically, Non-Patent Literature 2 discloses a procedure in which a UE in the RRC_INACTIVE state transmits UL data using a grant-free radio resource without receiving an UL grant from a gNB (see FIG. 4). For example, each cell broadcasts its own grant-free radio resources in system information (SI), and the UE selects a resource derived from its unique RAN UE ID.

Meanwhile, Non-Patent Literature 3 discloses a procedure in which a UE transmits UL data simultaneously with a third message (Message 3 (Msg3)) of the random access procedure, i.e., an RRC message (e.g., an RRC Connection Resume Request) (see FIG. 5). When the gNB receives UL data in the procedure disclosed in Non-Patent Literature 3, it can instruct the UE either to remaining the RRC_INACTIVE state or to enter the RRC_CONNECTED state. The gNB transmits an RRC response indicating "RRC suspend" to the UE in order for the UE to remain in the RRC_INACTIVE state, or it transmits an RRC response indicating "RRC resume" to the UE in order to move the UE to the RRC_CONNECTED state. That is, it can be said that the procedure disclosed in Non-Patent Literature 3 is a procedure in which a UE transmits UL data without fully entering the RRC_CONNECTED state. Alternatively, it can be said that the procedure disclosed in Non-Patent Literature 3 is a procedure in which a UE transmits UL data before entering the RRC_CONNECTED state.

CITATION LIST

Non Patent Literature

[Non-Patent Literature 1] 3GPP TR 23.799 V14.0.0 (2016-12) "3rd Generation Partnership Project; Technical Specification Group Services and System Aspects; Study on Architecture for Next Generation System (Release 14)", December 2016

[Non-Patent Literature 2] 3GPP R2-168544, Huawei, HiSilicon, "UL data transmission in RRC_INACTIVE", 3GPP TSG-RAN WG2 Meeting #96, Reno, USA 14th-18th November 2016

[Non-Patent Literature 3] 3GPP R2-168713, Ericsson, "Baseline solution for small data transmission in RRC_INACTIVE", 3GPP TSG-RAN WG2 Meeting #96, Reno, USA 14th-18th November 2016

SUMMARY OF INVENTION

Technical Problem

The inventors have studied UL data transmission in the RRC_INACTIVE state and found some problems. For example, it may be inappropriate to perform UL data transmission in the RRC_INACTIVE state whenever a UE desires. That is, one of the problems is to determine where or when a UE is allowed to perform UL data transmission in the RRC_INACTIVE state.

As an example, although the UE 301 has performed UL data transmission in the RRC_INACTIVE state (for example, the transmission procedure disclosed in Non-Patent Literature 2 or 3) in the cell 352 in FIG. 3, the gNB 312 cannot succeed in receiving the UL data due to some issue. For example, when the gNB 312 has not succeeded in retrieving the AS context of the UE 301 from the gNB 311, the gNB 312 could fail to receive the UL data. Alternatively, the gNB 312 could fail to receive data using the retrieved AS context (for example, in the case of failing to decrypt the UL data based on the AS security context). In those cases, transmission power of the UE may be wasted. In addition, when the UE 301 needs to reconnect to the cell 352 or another cell, a predetermined time may elapse since the layer 2 (e.g., PDCP) of the UE 301 has received a packet (e.g., a PDCP Service Data Unit (SDU)) from an upper layer (that is, a delay may occur), and thus the packet may be discarded.

Accordingly, one of the objects to be attained by embodiments disclosed herein is to provide an apparatus, a method, and a program that allow a UE to perform UL data transmission in the RRC_INACTIVE state in an appropriate situation. It should be noted that this object is merely one of the objects to be attained by the embodiments disclosed herein. Other objects or problems and novel features will be made apparent from the following description and the accompanying drawings.

Solution to Problem

In a first aspect, a radio terminal includes a transceiver and at least one processor. The at least one processor is configured to control the transceiver in one or more cells associated with a radio access network (RAN). The at least one processor is configured to control state transitions of the radio terminal among first to third RRC states. The first RRC state is a state in which the radio terminal and the RAN maintain an access stratum (AS) context and in which a location of the radio terminal is known to the RAN at cell level. The second RRC state is a state in which the radio terminal and the RAN maintain at least part of the AS context and in which the location of the radio terminal is known to the RAN at RAN notification area level configured by the RAN. The third RRC state is a state in which the radio terminal and the RAN have released the AS context and in which the location of the radio terminal is not known to the RAN. The at least one processor is further configured to, if the radio terminal is in the second RRC state, if a current cell that the radio terminal has camped on is different from a first cell in which a state transition from the first RRC state to the second RRC state was performed, and if the current cell satisfies a predetermined condition, allow the radio terminal to transmit data to be transmitted in the current cell by a first transmission procedure in which the radio terminal transmits uplink data before entering the first RRC state.

In a second aspect, a base station placed in a radio access network (RAN) includes a memory and at least one processor couple to the memory. The at least one processor is configured to control state transitions of a radio terminal among first to third RRC states. The at least one processor is further configured to transmit, to the radio terminal, configuration information indicating at least one particular cell in which the radio terminal in the second RRC state is allowed to perform a first transmission procedure in which the radio terminal transmits uplink data before entering the first RRC state.

In a third aspect, a method for a radio terminal includes: (a) controlling state transitions of the radio terminal among first to third RRC states; and (b) if the radio terminal is in the second RRC state, if a current cell that the radio terminal has camped on is different from a first cell in which a state transition from the first RRC state to the second RRC state was performed, and if the current cell satisfies a predetermined condition, allowing the radio terminal to transmit data to be transmitted in the current cell by a first transmission procedure in which the radio terminal transmits uplink data before entering the first RRC state.

In a fourth aspect, a method for a base station placed in a Radio Access Network (RAN) includes: (a) controlling state transitions of a radio terminal among first to third RRC states; and (b) transmitting, to the radio terminal, configuration information indicating at least one particular cell in which the radio terminal in the second RRC state is allowed to perform a first transmission procedure in which the radio terminal transmits uplink data before entering the first RRC state.

In a fifth aspect, a program includes instructions (software codes) that, when loaded into a computer, cause the computer to perform the method according to the above-described third of fourth aspect.

Advantageous Effects of Invention

According to the above-deceived aspects, it is possible to provide an apparatus, a method, and a program that allow a UE to perform UL data transmission in the RRC_INACTIVE state in an appropriate situation.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on a 5G system that uses an RRC_INACTIVE state. However, these embodiments may be applied to other radio communication systems using an RRC_INACTIVE state or a similar RRC state.

First Embodiment

Figure 1:
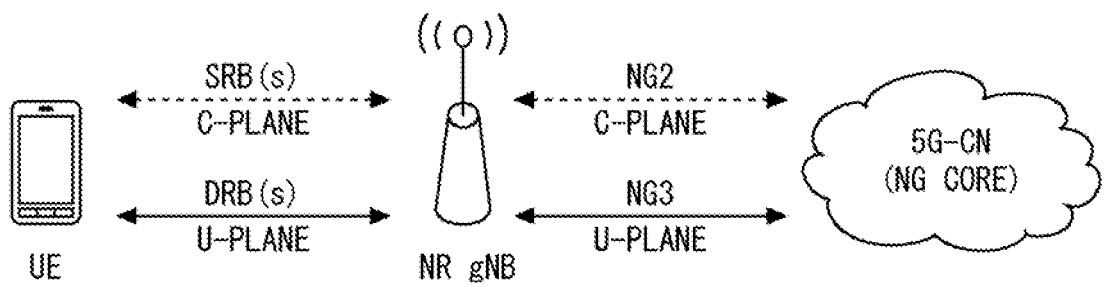
FIG. 1 is a diagram showing basic architecture of the 5G System according to the Background Art.
Figure 2:
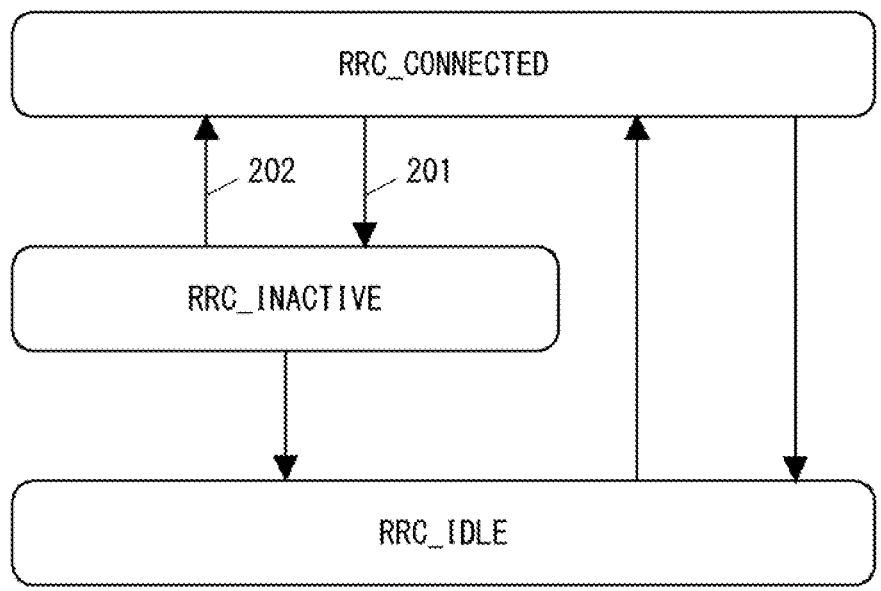
FIG. 2 is a diagram showing state transitions among the three RRC states in the 5G system according to the Background Art.
Figure 3:
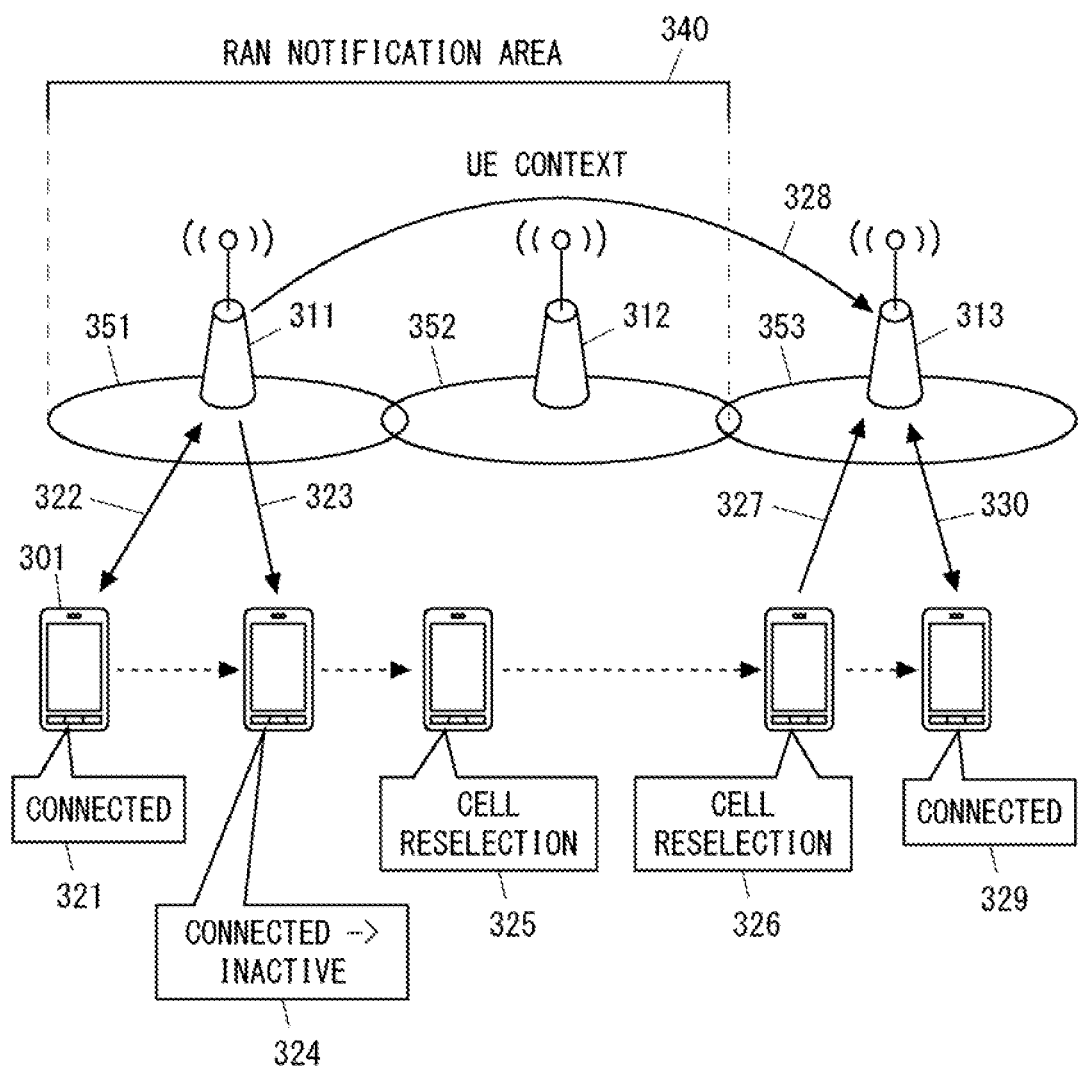
FIG. 3 is a diagram showing one example of mobility of a UE in RRC_INACTIVE state according to the Background Art.
Figure 4:
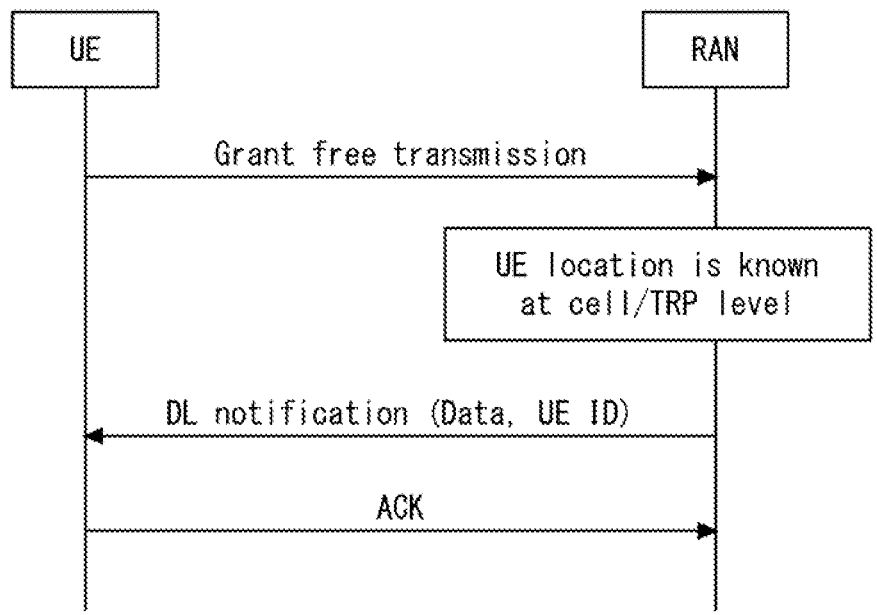
FIG. 4 is a diagram showing one example of an UL transmission procedure in RRC_INACTIVE state according to the Background Art.
Figure 5:
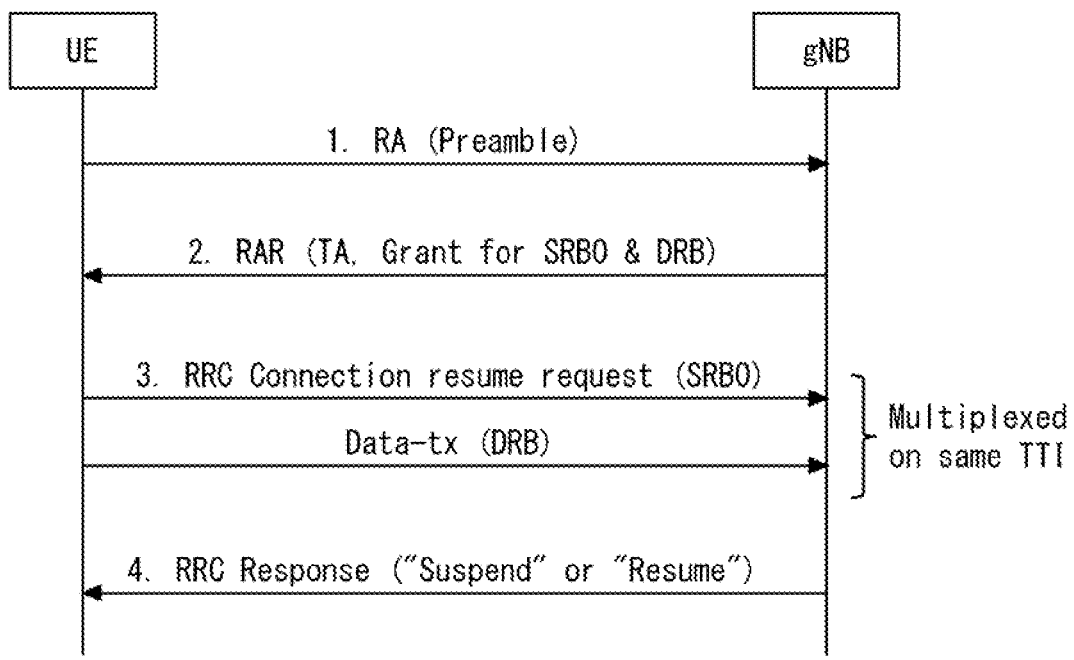
FIG. 5 is a diagram showing one example of an UL transmission procedure in RRC_INACTIVE state according to the Background Art.
Figure 6:
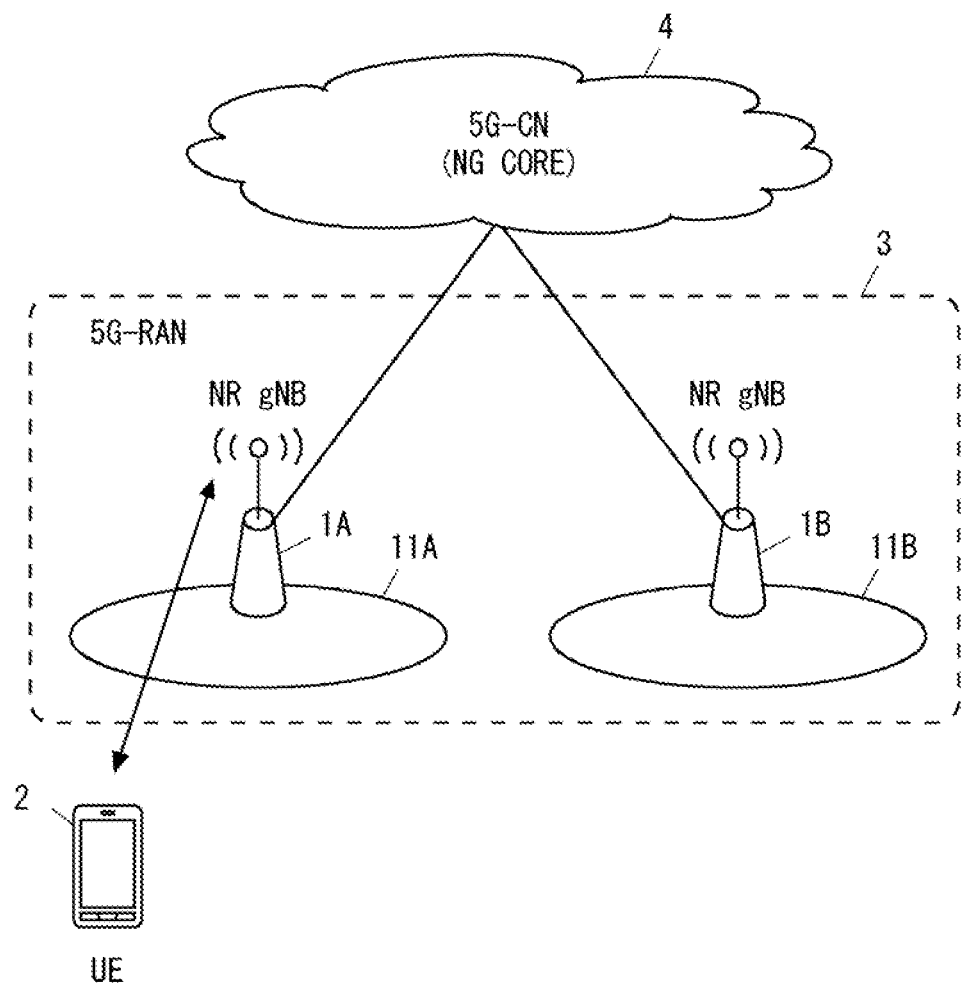
FIG. 6 is a diagram showing a configuration example of a radio communication network according to a plurality of embodiments.

FIG. 6 shows a configuration example of a radio communication network according to a plurality of embodiments including this embodiment. In the example of FIG. 5, the radio communication network includes a 5G UE 2, a 5G-RAN 3, and a 5G-CN 4.

The 5G-CN 4 includes Control Plane Network Functions (CP NFs) and User Plane Network Functions (UP NFs), which are not shown. The 5G-CN 4 may provide a plurality of network slices. The network slices are distinguished from one another according to, for example, services or use cases provided to UEs on each of the network slices. The use cases include, for example, enhanced Mobile Broad Band (eMBB), Ultra Reliable and Low Latency Communication (URLLC), and massive Machine Type Communication (mMTC).

The 5G-RAN 3 includes a plurality of gNBs, including a gNB 1A and a gNB 1B. Each gNB 1 (e.g., gNB 1A and gNB 1B) serves at least one cell 11 (e.g., cell 11A and cell 11B). Each gNB 1 is connected to the 5G-CN 4 and may support one or more network slices. In other words, one or more network slices may be supported or available in the cell 11 of each gNB 1. In some implementations, in order to provide end-to-end network slicing to the UE 2, the 5G-RAN 3 assigns, to the UE 2, a RAN slice and a radio slice associated with a network slice of the 5G-CN 4 (referred to as a Core Network (CN) slice) selected for the UE 2. Each RAN slice provides storage and processing resources of the infrastructures within the 5G-RAN 3 including the gNB 1. Each radio slice provides radio resources including time resources, frequency resources, code resources, signal sequence resources, or spatial resources, or any combination thereof.

The UE 2 uses one or more cells 11 served by one or more gNBs 1 for uplink and downlink communication. The UE 2 supports a plurality of RRC states including the RRC_CONNECTED state, the RRC_INACTIVE state, and the RRC_IDLE state. The 5G-RAN 3 (gNB 1) and the UE 2 control state transitions of the UE 2 among the RRC states including the RRC_CONNECTED, RRC_INACTIVE, and RRC_IDLE states.

For example, when the gNB 1A moves the UE 2 from the RRC_CONNECTED state to the RRC_INACTIVE state, it transmits, to the UE 2, RAN notification area information via an RRC message (e.g., RRC Connection Release, RRC Connection Suspend, or RRC Connection Deactivate) to configure the RAN notification area in the UE 2. The RAN notification area includes one or more cells served by one or more gNBs 1. The UE 2 enters the RRC_INACTIVE state in response to receiving the RRC message from the gNB 1A. The UE 2 in the RRC_INACTIVE state moves between cells by cell reselection controlled by the UE 2, and does not need to report the cell reselection (i.e., update of UE location information) within the RAN notification area to the 5G-RAN 3. In contrast, in response to reselecting a cell (e.g., cell 11B) outside the configured RAN notification area, the UE 2 requests the gNB 1B serving the reselected cell 11B to update the RAN notification area (or notify the gNB 1B that it has left the configured RAN notification area). The gNB 1B determines a new RAN notification area for the UE 2, and configures the determined RAN notification area in the UE 2. That is, as described above, the location of the UE 2 in the RRC_INACTIVE state is known to the 5G-RAN 3 at RAN notification area level.

As already described, the RAN notification area (RNA) includes one or more cells, is determined by the 5G-RAN 3, and is configured in the UE 2 by the 5G-RAN 3. The RAN notification area is also referred to as a RAN-based Notification Area, a RAN paging area, or a RAN location update area.

The RAN notification area information may include at least, for example, information indicating which cell is included in the RAN notification area. In addition, the RAN notification area may be assigned an identifier (e.g., area number). Furthermore, the relationship between an identifier of the RAN notification area (e.g., RNA ID) and the cell(s) contained therein may be determined uniquely within a predetermined area. In this case, the RAN notification area information may include an identifier of the RAN notification area and information regarding the contained cell(s) (e.g., cell identifier(s)).

The gNB 1A may broadcast the RAN notification area information in its cell 11A. At this time, the RAN notification area information may include information relating to a plurality of RAN notification areas, they may be assigned their respective conditions (e.g., category, type), and the UE 2 may select one RAN notification area suitable for the UE 2. The condition is, for example, a slice category or slice type (e.g., Slice/Service Type (SST)) of a network slice used (or desired) by the UE 2, a terminal category or terminal type, reception quality at the UE 2 or a coverage level based thereon, mobility characteristics of the UE 2 (e.g., UE speed, whether it is a stationary terminal), or any combination thereof.

The RAN notification area configured in the UE 2 may be the same as the location registration area of the UE 2 (i.e., area corresponding to the Tracking Area (TA) in LTE). When each individual RAN notification area (i.e., Slice specific RNA) is configured for each network slice, at least one of the RAN notification areas may be the same as the location registration area (e.g., TA). When the RNA is the same as the TA, an information element (e.g., RanAreaCellList Information Element (IE)) indicating a cell list included in this RNA may be omitted from the RAN notification area information transmitted from the gNB 1 to the UE 2 (that is, an Optional IE). Alternatively, the RAN notification area information may include an information element (e.g., TrackingAreaCode IE) indicating a TA identifier instead of the information element indicating the cell list (that is, Choice). In other words, the gNB 1 may select one of the RanAreaCellList IE and the TrackingAreaCode IE to indicate the RAN notification area.

In order to transmit the RAN notification area information including information relating to the plurality of RAN notification areas, the gNB 1A may receive RAN notification area information (e.g., combination of the identifier of a RAN notification area and the identifiers of cells constituting this RAN notification area) from another gNB (e.g., gNB 1B) through an inter-gNB interface (Xn). The other gNB may manage a cell belonging to another RAN notification area different from that to which the cell (e.g., cell 11A) of the gNB 1A belongs. Likewise, the RAN notification area-related information received from the other gNB may relate to another RAN notification area different from that to which the cell (e.g., cell 11A) of the gNB 1A belongs.

When the UE 2 uses (or desires) a plurality of network slices, it may select one RAN notification area based on the network slice having the highest priority or based on the network slice that is actually being used. Alternatively, the UE 2 may select one RAN notification area based on the network slice that is high on the list of network slice categories or types contained in the RAN notification area information.

The above-described RAN notification area information may include a RAN notification area (e.g., default RAN notification area) whose individual information (e.g., identifier, category, or type) is not explicitly specified. In this case, for example, the default RAN notification area may be used for the UE 2 regardless of the network slice, or may be used for network slices other than those explicitly indicated in the RAN notification area information. Furthermore, when the RAN notification area information includes a plurality of RAN notification areas, the UE 2 may not need to transmit to the gNB 1 a request for updating its location information as long as the cell after the cell reselection is included in at least one of the RAN notification areas.

Instead of the above-described instruction via the RRC message, the gNB 1 may notify the UE 2 about a value of a predetermined timer which triggers the transition to the RRC_INACTIVE state, to cause the UE 2 to execute the transition to the RRC_INACTIVE state based on the timer value and the corresponding timer. For example, the UE 2 in the RRC_CONNECTED state may restart the timer (i.e., reset the timer and start it again) each time it transmits or receives user data, and may transition to the RRC_INACTIVE state when the timer expires.

The UE 2 is further configured to perform UL data transmission in the RRC_INACTIVE state. Specifically, the UE 2 supports a procedure in which the UE 2 in the RRC_INACTIVE state transmits UL data without entering the RRC_CONNECTED state (i.e., a first transmission procedure). The UL data transmission in the RRC_INACTIVE state may be performed by a procedure in which the UE 2 transmits UL data while remaining in the RRC_INACTIVE state. Additionally or alternatively, the UL data transmission in the RRC_INACTIVE state may be performed by a procedure in which the UE 2 transmits UL data before entering the RRC_CONNECTED state. In other words, the UL data transmission in the RRC_INACTIVE state may be performed by a procedure in which the UE 2 transmits UL data without fully entering the RRC_CONNECTED state. In other words, the UL data transmission in the RRC_INACTIVE state may be performed during a procedure in which the UE 2 transitions from the RRC_INACTIVE state to the RRC_CONNECTED state.

In some implementations, the UE 2 may perform a procedure in which the UE 2 in the RRC_INACTIVE state transmits UL data using a grant-free radio resource without receiving a dedicated UL grant from the gNB (for example, the transmission procedure disclosed in Non-Patent Literature 2). Additionally or alternatively, the UE 2 may perform a procedure in which the UE 2 transmits UL data simultaneously with the third message (Message 3 (Msg3)) of the random access procedure, i.e., an RRC message (e.g., an RRC Connection Resume Request) (for example, the transmission procedure disclosed in Non-Patent Literature 3).

The UE 2 (e.g., a controller in the UE 2) according to the present embodiment operates as follows to determine whether the UE 2 is allowed to perform UL data transmission in the RRC_INACTIVE state. The UE 2 (e.g., the controller in the UE 2) allows the UE 2 to transmit UL data in the current cell by the first transmission procedure if the UE 2 is in the RRC_INACTIVE state, if the current cell that the UE 2 has camped on (i.e. the serving cell) is different from a first cell in which the transition from the RRC_CONNECTED state to the RRC_INACTIVE state was performed, and if the current cell satisfies a predetermined condition. The first transmission procedure provides UL data transmission in the RRC_INACTIVE state. That is, in the first transmission procedure, the UE 2 transmits UL data without entering the RRC_CONNECTED state, or transmits UL data before entering the RRC_CONNECTED state (that is, before the transition to the RRC_CONNECTED state is completed).

On the other hand, if the current cell (i.e. the serving cell) does not satisfy the predetermined condition, the UE 2 (e.g., the controller in the UE 2) does not allow the UE 2 to transmit UL data in the current cell by the first transmission procedure, but it may allow the UE 2 to transmit UL data in the current cell by a second transmission procedure. The second transmission procedure provides UL data transmission in the RRC_CONNECTED state. That is, in the second transmission procedure, the UE 2 transmits UL data after transitioning from the RRC_INACTIVE state to the RRC_CONNECTED state (that is, after the transition to the RRC_CONNECTED state is completed).

Figure 7:
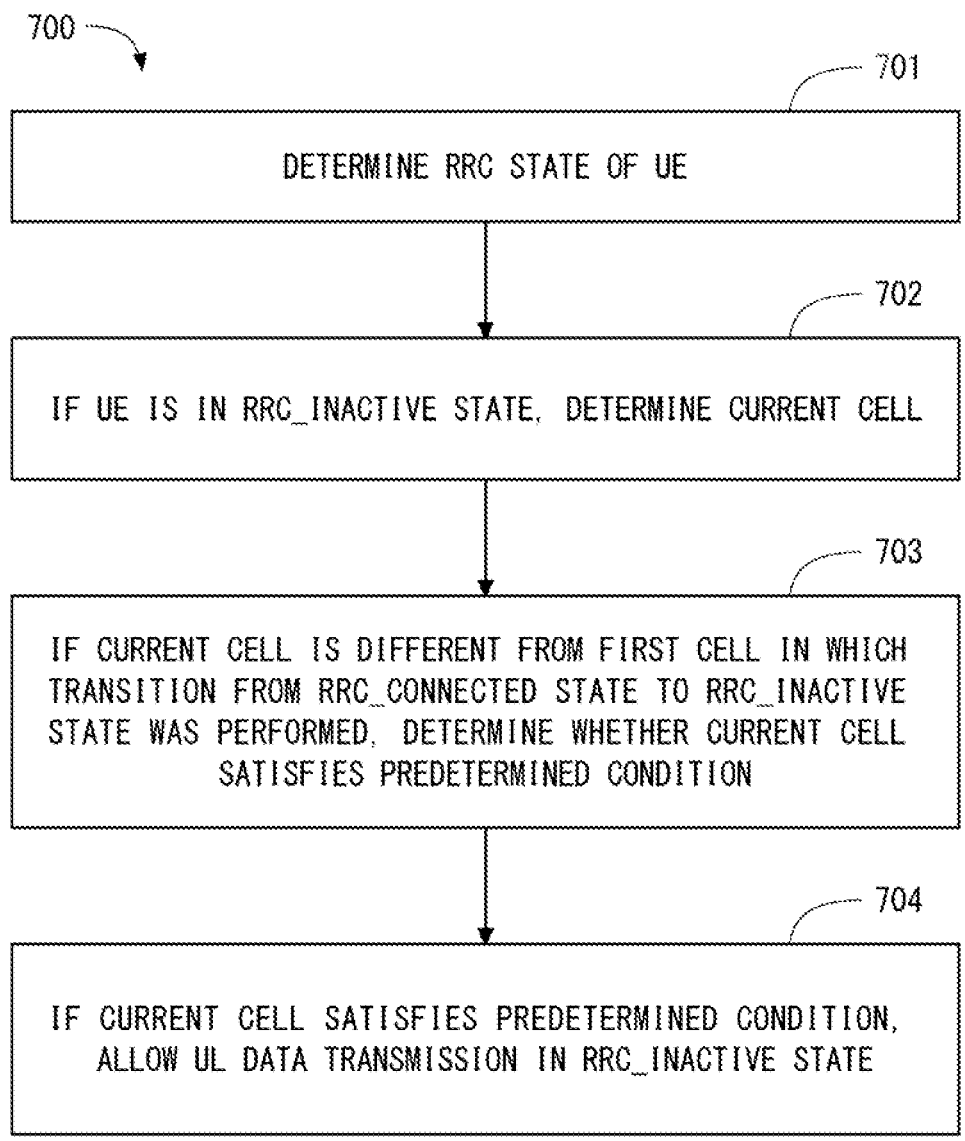
FIG. 7 is a flowchart showing an example of an operation of a UE according to a first embodiment.

FIG. 7 is a flowchart showing a process 700 that is an example of an operation of the UE 2. The process 700 may be performed when there is UL data to be transmitted in the UE 2. For example, the process 700 may be performed when an Access Stratum (AS) layer of the UE 2 receives UL data from an upper layer (e.g., a Non Access Stratum (NAS) layer). In Step 701, the controller in the UE 2 determines the RRC state of the UE 2. If the UE 2 is in the RRC_INACTIVE state, the controller determines the current cell (i.e., the serving cell) (Step 702). If the current cell is different from the first cell in which the transition from the RRC_CONNECTED state to the RRC_INACTIVE state was performed, the controller determines whether the current cell satisfies a predetermined condition (Step 703). If the current cell satisfies the predetermined condition, the controller allows the UE 2 to perform UL data transmission in the RRC_INACTIVE state (Step 704).

In an example, the predetermined condition regarding the current cell (i.e., the serving cell) includes a condition that the current cell is managed by the gNB managing the first cell. In order to determine whether the current cell and the first cell are managed by an identical gNB, the controller in the UE 2 may compare an identifier received in the current cell and identifying either the current cell or a gNB managing the current cell (e.g., a global gNB ID, a truncated gNB ID, or a temporary gNB ID) with an identifier of either the first cell or a gNB managing the first cell.

The gNB 1 that had instructed the UE 2 to transition from the RRC_CONNECTED state to the RRC_INACTIVE state maintains the AS context of the UE 2. Thus, if the UE 2 moves to another cell managed by the gNB 1, the gNB 1 can use the AS context of the UE 2 maintained by the gNB 1 itself to assist UL data transmission by the UE 2 in the RRC_INACTIVE state.

In another example, the predetermined condition regarding the current cell includes a condition that the current cell is included in at least one particular cell that was designated (or that had been already configured) by the gNB managing the first cell when the UE 2 transitioned from the RRC_CONNECTED state to the RRC_INACTIVE state. The at least one particular cell may be a subset of at least one cell that the RAN notification area consists of. Alternatively, the at least one particular cell may be identical to at least one cell that the RAN notification area consists of. Alternatively, the at least one particular cell may be one or more other cells managed by the same gNB as the first cell. That is, in an example, the RAN notification area may be synonymous with an area that consists of one or more cells managed by one gNB.

In another example, the predetermined condition regarding the current cell includes a condition that the current cell is included in a particular area configured separately from the RAN notification area that was designated (or that had been already configured) by the gNB managing the first cell when the UE 2 transitioned from the RRC_CONNECTED state to the RRC_INACTIVE state. The particular area may be referred to as, for example, a UE Context available Area (UCA). The UE Context available Area may be defined by a predetermined identifier (e.g., UCA Identity). In this case, such an identifier may be transmitted from the gNB in each cell as system information. Alternatively, the UE Context available Area may be defined by one or more cells. The UE 2 is only required to determine whether the identifier of the UE Context available Area (or the cell identifier) of the current cell corresponds to that of the configured UE Context available Area.

The predetermined condition regarding the current cell may be different per bearer or flow (i.e., PDU flow or QoS flow). For example, the RAN notification area is configured on a per-UE basis (or on a per-serving cell basis), whereas the above-described UE Context available Area may be configured on a per-bearer or per-flow basis.

Figure 8:
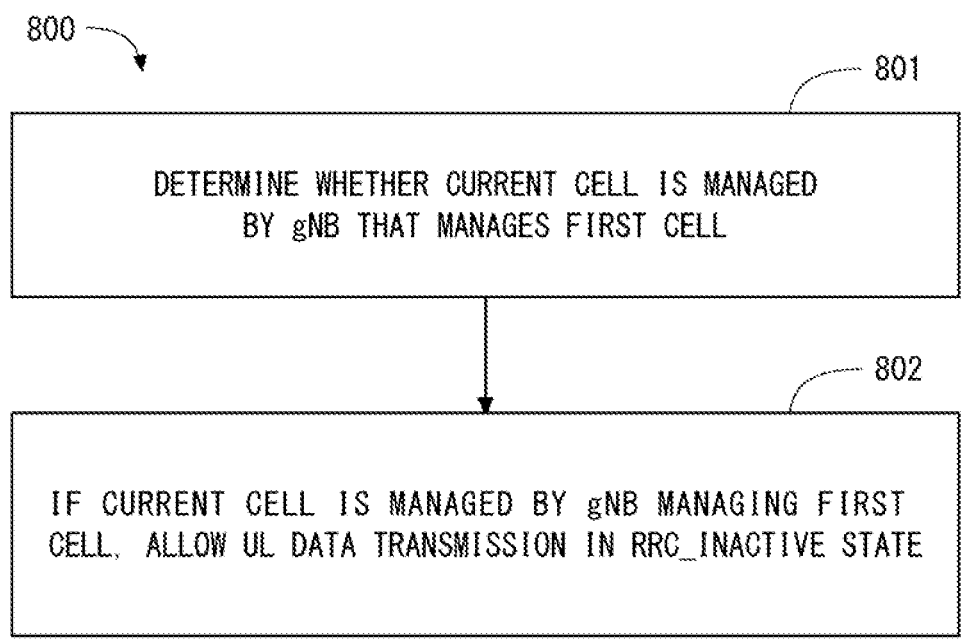
FIG. 8 is a flowchart showing an example of an operation of a UE according to the first embodiment.

FIG. 8 is a flowchart showing a process 800 that is an example of processing for determining the predetermined condition regarding the current cell. In Step 801, the controller in the UE 2 determines whether the current cell is managed by the same gNB as the first cell. In Step 802, if the current cell is managed by the same gNB as the first cell, the controller allows the UE 2 to perform UL data transmission in the RRC_INACTIVE state.

Figure 9:
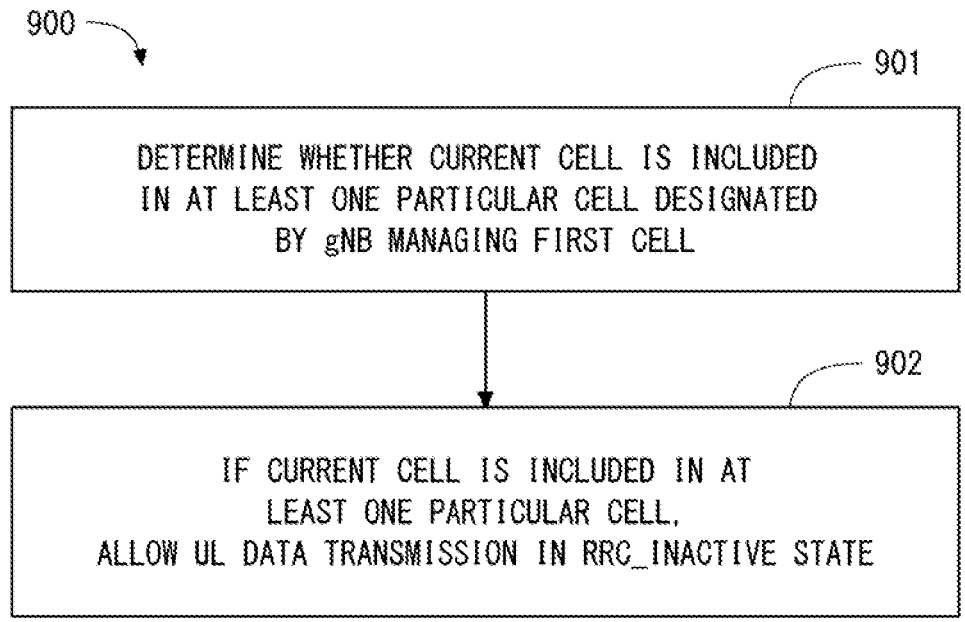
FIG. 9 is a flowchart showing an example of an operation of a UE according to the first embodiment.

FIG. 9 is a flowchart showing a process 900 that is another example of the processing for determining the predetermined condition regarding the current cell. In Step 901, the controller in the UE 2 determines whether the current cell is included in at least one particular cell designated for the UE 2 by the gNB managing the first cell. In Step 902, if the current cell is included in the at least one particular cell, the controller allows the UE 2 to perform UL data transmission in the RRC_INACTIVE state.

The processing (e.g., the process 800 or the process 900) of the controller in the UE 2 may be performed by the AS layer (e.g., an RRC, PDCP, RLC, or MAC sublayer) of the UE 2. In addition, the processing of the controller may be performed by a plurality of sublayers in the AS layer.

Figure 10:
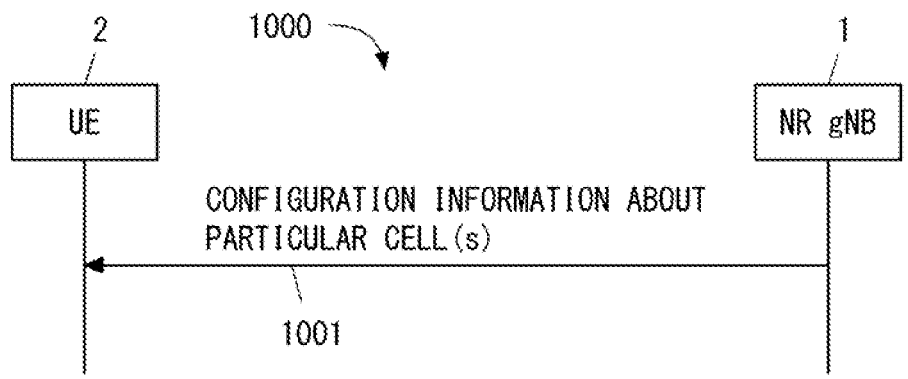
FIG. 10 is a sequence diagram showing an example of operations of a gNB and a UE according to the first embodiment.

The following provides examples of an operation of the gNB 1. In an example, as described above, the gNB 1 may transmit, to the UE 2, configuration information indicating at least one particular cell in which the UE 2 in the RRC_INACTIVE state is allowed to perform the first transmission procedure in which the UE 2 transmits UL data without entering the RRC_CONNECTED state or before entering the RRC_CONNECTED state (that is, before the transition to the RRC_CONNECTED state is completed). The gNB 1 may transmit the configuration information via a dedicated signal (e.g., dedicated RRC signaling), or transmit (or broadcast) it in its cell 11 as system information. FIG. 10 is a sequence diagram showing a process 1000 that is an example of an operation of the gNB 1. In Step 1001, the gNB 1 transmits the configuration information indicating the at least one particular cell to the UE 2. The gNB 1 may transmits the configuration information to the UE 2 when the UE 2 transitions from the RRC_CONNECTED state to the RRC_INACTIVE state in the cell 11 managed by the gNB 1.

As described above, the particular cell(s) designated for the UE 2 by the gNB 1 may be one or more cells managed by this gNB. In this case, the configuration information indicating the particular cell(s) may include a cell list indicating the one or more cells managed by the gNB 1 that transmits the configuration information. This enables the UE 2 to determine, based on the configuration information indicating the particular cell(s), whether the cell 11 that the UE 2 is currently camped on is managed by the first gNB 1. In some implementations, the list of the particular cell(s) may be provided by the gNB 1 to the UE 2 as a neighbor cell list. In this case, the neighbor cell list transmitted from the gNB 1 to the UE 2 may include both a first sub-list indicating cells managed only by the gNB 1 and a second sub-list indicating cells managed by other gNBs. When the neighbor cell list includes the first sub-list and the second sub-list, the UE 2 may recognize, regardless of no explicit identifier of the gNB 1, that the first sub-list consists of cells managed only by the gNB 1 and that the second sub-list consists of cells managed by gNBs other than the gNB 1. For example, the UE 2 may recognize information elements located in the top part of the neighbor cell list (or information elements having larger sub-list identifiers allocated) as the first sub-list, and recognize information elements located in the bottom part (or information elements having smaller sub-list identifiers allocated) as the second sub-list.

Additionally or alternatively, the particular cell(s) designated for the UE 2 by the gNB 1 may be a subset of a cell(s) that the RAN notification area for the UE 2 consists of. In this case, the configuration information indicating the particular cell(s) may indicate whether each cell included in the RAN notification area is the particular cell.

In addition, in an example as descried above, the gNB 1 may configure a "particular area" different from the RAN notification area to the UE 2 in order to notify the UE 2 of the cell(s) in which the UE 2 in the RRC_INACTIVE state is allowed to perform the first transmission procedure. The particular area may be referred to as, for example, a UE Context available Area (UCA). The gNB 1 may transmit configuration information indicating one or more cells included in the UE Context available Area to the UE 2. The gNB 1 may transmit the configuration information about the UE Context available Area via a dedicated signal (e.g., dedicated RRC signaling) or may broadcast it in its cell 11 as system information.

The gNB 1 may transmit an identifier of the gNB 1 (e.g., a gNB ID, a Truncated gNB ID, or a Temporary network identity) in each cell 11 that it manages, in order to allow the UE 2 to identify the gNB 1 providing each cell 11 and to distinguish the gNB 1 from other gNBs. The identifier of the gNB 1 may be transmitted in System information (SI). The System information may be included in a broadcast system information block to be broadcast in each cell 11. Alternatively, the System information may be included in an on-demand system information block to be transmitted to the UE 2 in response to a request message from the UE 2. This enables the UE 2 to identify the gNB 1 providing the cell 11 that the UE 2 has camped on and to distinguish it from other gNBs.

Alternatively, a cell identifier of the cell 11 (e.g., a Physical Cell ID, a Physical Cell ID, and a Carrier frequency (e.g., ARFCN), or a Cell Global ID) may be used to identify the gNB 1 that manages this cell. In other words, the identifier of the gNB 1 may be embedded in the cell identifier of the cell 11. This enables the UE 2 to identify, based on the cell identifier of the cell 11, the gNB 1 providing the cell 11 that the UE 2 has camped on and to distinguish it from other gNBs.

Additionally or alternatively, when the gNB 1 has a Cloud Radio Access Network (C-RAN) configuration, which is to be described later, and manages one or more Transmission Reception Points (TRPs or TRxPs), an identifier (e.g., a TRP ID) of a TRP forming the cell 11 may be used to identify the gNB 1 that manages this TRP. In other words, the identifier of the gNB 1 may be embedded in the TRP identifier of the TRP.

Note that, the identifier of the gNB 1 described above is used by the UE 2 to know the area consisting of one or more cells managed by this gNB 1. Thus, it can be said that the identifier of the gNB 1 is an "area identifier" for identifying the area consisting of one or more cells managed by the gNB 1. That is, the gNB 1 transmits the area identifier in one or more cells that it manages. If the area identifier received in the current cell is identical to that in the first cell, the controller in the UE 2 may allow the UE 2 to perform data transmission in the RRC_INACTIVE state.

As can be understood from the above description, the UE 2 according to the present embodiment is allowed to perform UL data transmission by the first transmission procedure if UL data to be transmitted in the RRC_INACTIVE state occurs in the first cell in which the transition from the RRC_CONNECTED state to the RRC_INACTIVE state was performed. On the other hand, if the UE 2 is in the RRC_INACTIVE state, if the current cell (i.e., the serving cell) that the UE 2 has camped on is different from the first cell in which the transition from the RRC_CONNECTED state to the RRC_INACTIVE state was performed, and if the current cell satisfies the predetermined condition, the UE 2 is allowed to transmit UL data in the current cell by the first transmission procedure. Thus, it is possible to restrict the situations in which the UE 2 is allowed to perform UL data transmission in the RRC_INACTIVE state. Accordingly, the present embodiment enables a UE to perform UL data transmission in the RRC_INACTIVE state in an appropriate situation.

Second Embodiment

The present embodiment provides a modification of the operation of the UE 2 described in the first embodiment. A configuration example of a radio communication network in the present embodiment is similar to that in FIG. 6.

The UE 2 according to the present embodiment (e.g., the controller in the UE 2) is configured to, if the UE 2 performed cell reselection in the RRC_INACTIVE state, if the current cell (i.e., a target cell of the cell reselection) is not included in a RAN notification area configured to the UE 2, and if an update procedure of UE location information or an update procedure of the RAN notification area has not been performed, allow the UE 2 to transmit UL data in the current cell by the above-described first or second transmission procedure after the registration procedure of the UE location information or the update procedure of the RAN notification area is performed. The UE 2 transmits an RAN notification area update request message to the gNB 1. This message may be transmitted using an RRC message for requesting the transition from RRC_INACTIVE to RRC_CONNECTED (e.g., an RRC Resume Request message). When the gNB 1 receives the RAN notification area update request message from the UE 2, the gNB 1 can instruct the UE 2 either to remain in the RRC_INACTIVE state or to enter the RRC_CONNECTED state. The gNB 1 transmits an RRC response indicating "RRC suspend" to the UE in order for the UE 2 to remain in the RRC_INACTIVE state, or it transmits an RRC response indicating "RRC resume" to the UE 2 in order for the UE 2 to transition to the RRC_CO-NNECTED state. Alternatively, the UE 2 may transmit the RAN notification area update request message to the gNB 1 after fully transitioning to RRC_CONNECTED. Thus, when the UE 2 reselects a cell outside the configured RAN notification area, the UE 2 performs the update procedure of the RAN notification area first. Accordingly, in the present embodiment, it is possible to avoid a situation where the UE 2 performs UL data transmission in the RRC_INACTIVE state in a cell outside the RAN notification area and thus the gNB 1 does not succeed in receiving the UL data.

Note that, the UE 2 may transmit UL data using a completion message of the registration procedure of the UE location information or of the update procedure of the RAN notification area (e.g., an RRC Connection Resume Complete). In other words, the UE 2 may transmit UL data in the registration procedure of the RAN-level UE location information or in the update procedure of the RAN notification area.

Figure 11:
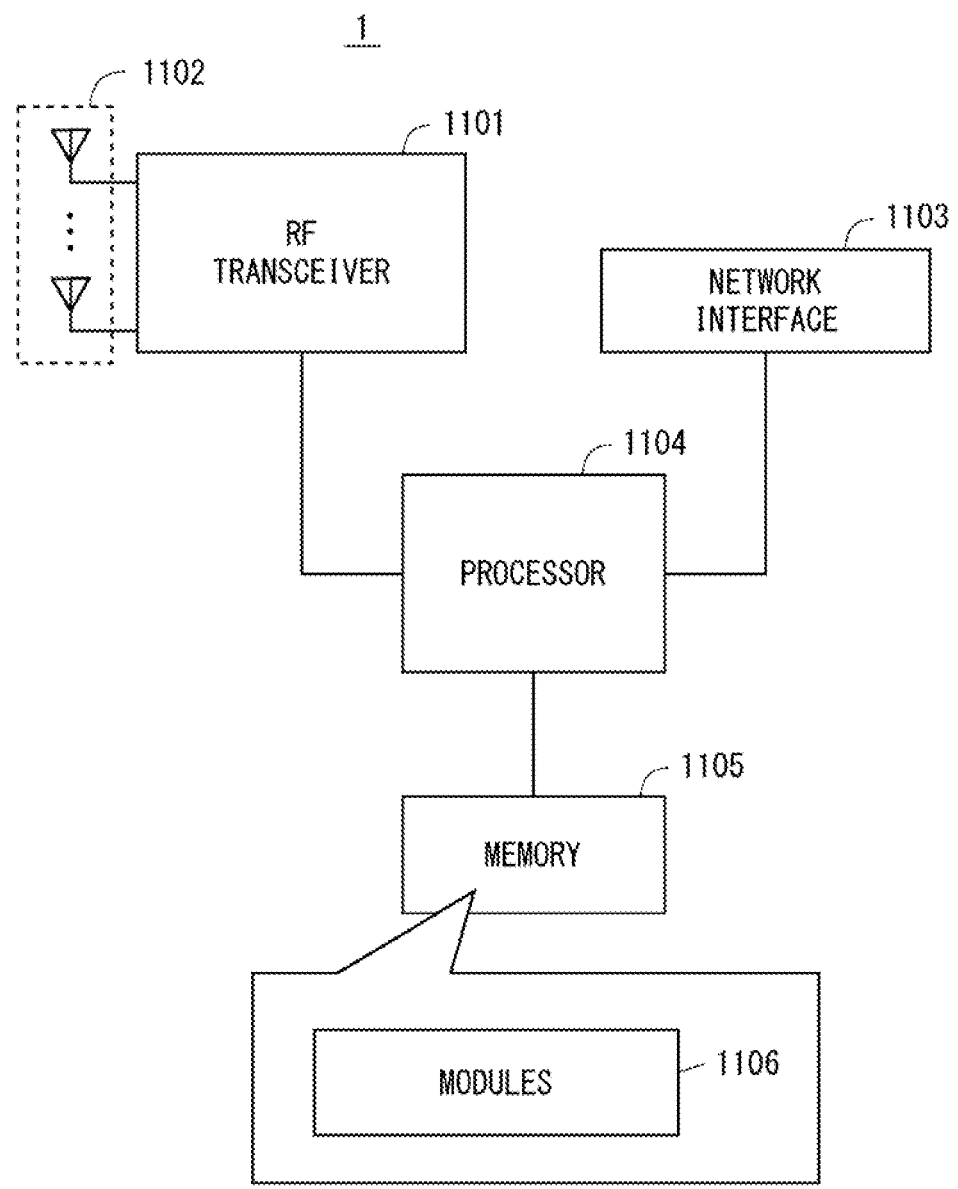
FIG. 11 is a block diagram showing a configuration example of a gNB according to a plurality of embodiments.

The following provides configuration examples of the gNB 1 and the UE 2 according to the above embodiments. FIG. 11 is a block diagram showing a configuration example of the gNB 1 according to the above embodiments. Referring to FIG. 11, the gNB 1 includes a Radio Frequency transceiver 1101, a network interface 1103, a processor 1104, and a memory 1105. The RF transceiver 1101 performs analog RF signal processing to communicate with NG UEs including the UE 2. The RF transceiver 1101 may include a plurality of transceivers. The RF transceiver 1101 is coupled to an antenna array 1102 and the processor 1104. The RF transceiver 1101 receives modulated symbol data from the processor 1104, generates a transmission RF signal, and supplies the transmission RF signal to the antenna array 1102. Further, the RF transceiver 1101 generates a baseband reception signal based on a reception RF signal received by the antenna array 1102 and supplies the baseband reception signal to the processor 1104. The RF transceiver 1101 may include an analog beamformer circuit for beam forming. The analog beamformer circuit includes, for example, a plurality of phase shifters and a plurality of power amplifiers.

The network interface 1103 is used to communicate with network nodes (e.g., a control node and a transfer node in the 5G-CN 4). The network interface 1103 may include, for example, a network interface card (NIC) conforming to the IEEE 802.3 series.

The processor 1104 performs digital baseband signal processing (i.e., data-plane processing) and control-plane processing for radio communication. The processor 1104 may include a plurality of processors. The processor 1104 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1104 may include a digital beamformer module for beam forming. The digital beamformer module may include a Multiple Input Multiple Output (MIMO) encoder and a pre-coder.

The memory 1105 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1105 may include a storage located apart from the processor 1104. In this case, the processor 1104 may access the memory 1105 via the network interface 1103 or an I/O interface (not shown).

The memory 1105 may store one or more software modules (computer programs) 1106 including instructions and data to perform processing by the gNB 1 described in the above embodiments. In some implementations, the processor 1104 may be configured to load the software modules 1106 from the memory 1105 and execute the loaded software modules, thereby performing processing of the gNB 1 described in the above embodiments.

Figure 12:
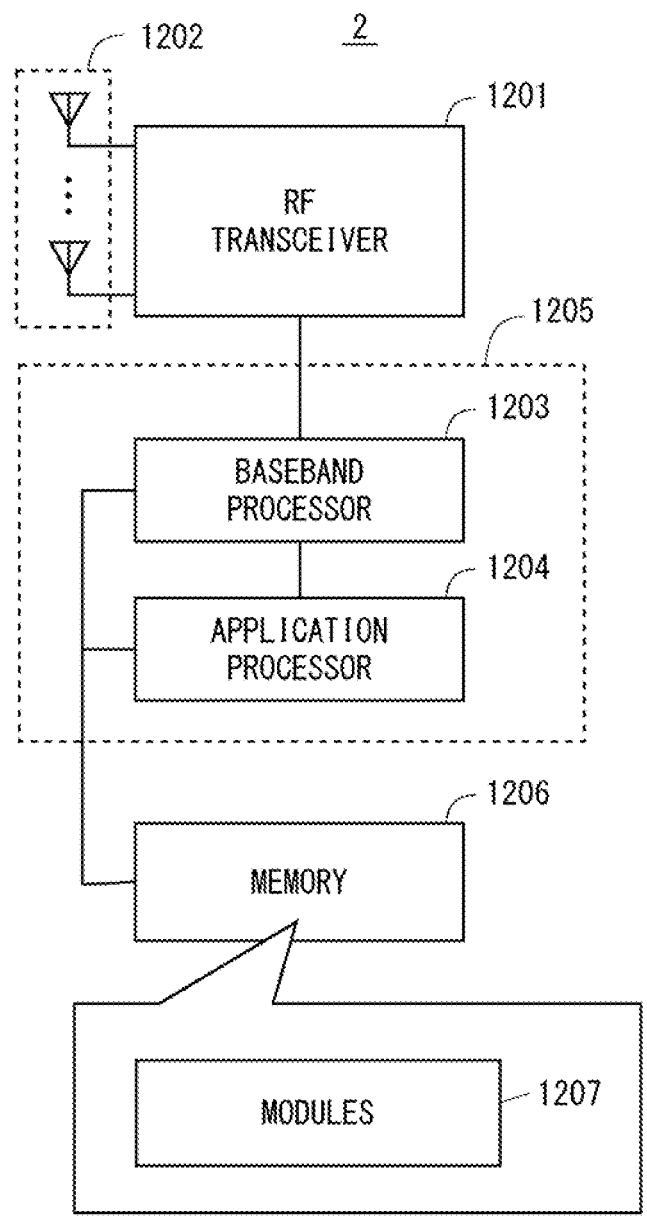
FIG. 12 is a block diagram showing a configuration example of a UE according to a plurality of embodiments.

FIG. 12 is a block diagram showing a configuration example of the UE 2. A Radio Frequency (RF) transceiver 1201 performs analog RF signal processing to communicate with the gNB 1. The RF transceiver 1201 may include a plurality of transceivers. The analog RF signal processing performed by the RF transceiver 1201 includes frequency up-conversion, frequency down-conversion, and amplification. The RF transceiver 1201 is coupled to an antenna array 1202 and a baseband processor 1203. The RF transceiver 1201 receives modulated symbol data (or OFDM symbol data) from the baseband processor 1203, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the baseband processor 1203. The RF transceiver 1201 may include an analog beamformer circuit for beam forming. The analog beamformer circuit includes, for example, a plurality of phase shifters and a plurality of power amplifiers.

The baseband processor 1203 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1203 may include, for example, signal processing of a Packet Data Convergence Protocol (PDCP) layer, a Radio Link Control (RLC) layer, a MAC layer, and a PHY layer. Further, the control-plane processing performed by the baseband processor 1203 may include processing of a Non-Access Stratum (NAS) protocol, an RRC protocol, and MAC CEs.

The baseband processor 1203 may perform MIMO encoding and pre-coding for beam forming.

The baseband processor 1203 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1204 described in the following.

The application processor 1204 is also referred to as a CPU, an MPU, a microprocessor, or a processor core. The application processor 1204 may include a plurality of processors (processor cores). The application processor 1204 loads a system software program (Operating System (OS)) and various application programs (e.g., a call application, a WEB browser, a mailer, a camera operation application, and a music player application) from a memory 1206 or from another memory (not shown) and executes these programs, thereby providing various functions of the UE 2.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a system Large Scale Integration (LSI) or a chipset.

The memory 1206 is a volatile memory, a non-volatile memory, or a combination thereof. The memory 1206 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data to perform the processing by the UE 2 described in the above embodiments. In some implementations, the baseband processor 1203 or the application processor 1204 may load these software modules 1207 from the memory 1206 and execute the loaded software modules, thereby performing the processing of the UE 2 described in the above embodiments with reference to the drawings.

As described above with reference to FIGS. 11 and 12, each of the processors included in the gNB 1 and the UE 2 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

The 5G-RAN 3 described in the above embodiments may be implemented based on a Cloud Radio Access Network (C-RAN) concept. The C-RAN is also referred to as a Centralized RAN. In this case, processes and operations performed by the gNB 1 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), a Distributed Unit (DU), or a Transmission and Reception Point (TRP or TRxP). That is, processes and operations performed by the gNB 1 described in the above embodiments may be provided by one or more radio stations (or RAN nodes).

In the above embodiments, the UE 2 may further determine which procedure to be performed to transmit UL data of the UE 2 based on the size of UL data to be transmitted (e.g., the size or the number of PDCP SDU(s), or the PDCP buffer volume) or the type of UL data to be transmitted (e.g., a traffic type, a service type, a QoS, or a use case). For example, upon determining that UL data transmission by the first transmission procedure is allowed in the above embodiments, the UE 2 may further consider a predetermined second condition regarding the size or type of UL data. The second condition regarding the size of UL data may be that the size of UL data is smaller than a predetermined threshold. The second condition regarding the type of UL data may be that the type of UL data matches a predetermined type. Specifically, the UE 2 may perform UL data transmission by the first transmission procedure if the second condition is satisfied, or may perform UL data transmission by the second transmission procedure if the second condition is not satisfied. The second condition may be configured to the UE 2 by the gNB 1 beforehand or transmitted in each cell as system information. In the latter case, the UE 2 may receive the system information in response to cell reselection. In addition, the second condition when the UE 2 stays a cell in which the transition from the RRC_CONNECTED state to the RRC_INACTIVE state was performed may be different from that when the UE 2 moved from this cell to another cell by performing cell reselection. In other words, different second conditions for different situations including both the situation in which cell reselection in the RRC_INACTIVE state has been performed and the situation in which cell reselection in RRC_INACTIVE state has not been performed may be configured to the UE 2.

In the above embodiments, two options of the first transmission procedure have been described. In the first option, the UE 2 transmits UL data while remaining in the RRC_INACTIVE state. For example, in the first option, the UE 2 in the RRC_INACTIVE state may transmit UL data using a grant-free radio resource without receiving a dedicated UL grant from the gNB (for example, the transmission procedure disclosed in Non-Patent Literature 2). Meanwhile, in the second option, the UE 2 transmits UL data in the procedure for transitioning from the RRC_INACTIVE state to the RRC_CONNECTED state. For example, in the second option, the UE 2 may transmit UL data simultaneously with the third message (Message 3 (Msg3)) of the random access procedure, that is, an RRC message (e.g., an RRC Connection Resume Request) (for example, the transmission procedure disclosed in Non-Patent Literature 3). The UE 2 may support both of the first option and the second option and determine which one of the options is to be used based on a predetermined third condition. The third condition may be that the size (or the buffer size) of UL data is smaller than a predetermined threshold. Specifically, the UE 2 may use the first option if the size of UL data is smaller than the predetermined threshold, and may use the second option if the size of UL data is larger than the predetermined threshold. Additionally or alternatively, the UE 2 may receive system information (e.g., explicit available indication or a Radio resource configuration for corresponding option) in the current cell and determine which option is indicated to be allowed (or supported).

Further, the above-described embodiments are merely examples of applications of the technical ideas obtained by the inventors. These technical ideas are not limited to the above-described embodiments and various modifications may be made thereto.

For example, the whole or part of the above embodiments can be described as, but not limited to, the following supplementary notes.

(Supplementary Note 1)

A radio terminal comprising:

a transceiver; and at least one processor configured to control the transceiver in one or more cells associated with a radio access network (RAN), wherein the at least one processor is configured to control state transitions of the radio terminal among first to third RRC states, the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN, and the at least one processor is further configured to, if the radio terminal is in the second RRC state, if a current cell that the radio terminal has camped on is different from a first cell in which a state transition from the first RRC state to the second RRC state was performed, and if the current cell satisfies a predetermined condition, allow the radio terminal to transmit data to be transmitted in the current cell by a first transmission procedure in which the radio terminal transmits uplink data before entering the first RRC state.

(Supplementary Note 2)

The radio terminal according to Supplementary Note 1, wherein the predetermined condition includes a condition where the current cell and the first cell are managed by an identical base station.

(Supplementary Note 3)

The radio terminal according to Supplementary Note 2, wherein the at least one processor is configured to compare an identifier, received in the current cell, of either the current cell or a base station managing the current cell, with an identifier of either the first cell or a base station managing the first cell in order to determine whether the current cell and the first cell are managed by an identical base station.

(Supplementary Note 4)

The radio terminal according to any one of Supplementary Notes 1 to 3, wherein the predetermined condition includes a condition where the current cell is included in at least one particular cell designated by a base station managing the first cell when the radio terminal transitioned from the first RRC state to the second RRC state.

(Supplementary Note 5)

The radio terminal according to Supplementary Note 4, wherein the at least one particular cell is a subset of at least one cell that the RAN notification area consists of.

(Supplementary Note 6)

The radio terminal according to Supplementary Note 4, wherein the at least one particular cell is identical to at least one cell that the RAN notification area consists of.

(Supplementary Note 7)

The radio terminal according to any one of Supplementary Notes 1 to 6, wherein the at least one processor is configured to, if the current cell does not satisfy the predetermined condition, not allow the radio terminal to transmit in the current cell by the first transmission procedure and allow the radio terminal to transmit the data to be transmitted in the current cell by a second transmission procedure in which the radio terminal transmits uplink data after transitioning from the second RRC state to the first RRC state.

(Supplementary Note 8)

The radio terminal according to Supplementary Note 7, wherein the at least one processor is configured to, if the radio terminal is in the second RRC state, if the current cell is not included in the RAN notification area, and if an update procedure of the RAN notification area has not yet been performed, allow the radio terminal to transmit the data to be transmitted in the current cell by the first or second transmission procedure while or after performing the update procedure.

(Supplementary Note 9)

The radio terminal according to any one of Supplementary Notes 1 to 8, wherein the radio terminal is configured to, in the first transmission procedure, transmit the data to be transmitted without transitioning to the first RRC state.

(Supplementary Note 10)

The radio terminal according to any one of Supplementary Notes 1 to 9, wherein the radio terminal is configured to, in the first transmission procedure, transmit the data to be transmitted during a procedure for transitioning from the second RRC state to the first RRC state.

(Supplementary Note 11)

The radio terminal according to any one of Supplementary Notes 1 to 9, wherein the radio terminal is configured to, in the first transmission procedure, transmit the data to be transmitted while remaining in the second RRC state.

(Supplementary Note 12)

The radio terminal according to any one of Supplementary Notes 1 to 11, wherein the RAN notification area is an area where, when the radio terminal in the second RRC state moves between cells by cell reselection, the radio terminal does not need to notify the RAN of the cell reselection.

(Supplementary Note 13)

A base station for a radio access network (RAN), the base station comprising:

a memory; and at least one processor configured to control state transitions of a radio terminal among first to third RRC states, wherein the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN, and the at least one processor is further configured to transmit, to the radio terminal, configuration information indicating at least one particular cell in which the radio terminal in the second RRC state is allowed to perform a first transmission procedure in which the radio terminal transmits uplink data before entering the first RRC state.

(Supplementary Note 14)

The base station according to Supplementary Note 13, wherein the at least one processor is configured to transmit the configuration information to the radio terminal when the radio terminal transitions from the first RRC state to the second RRC state in a first cell managed by the base station.

(Supplementary Note 15)

The base station according to Supplementary Note 14, wherein the at least one particular cell is at least one cell managed by the base station managing the first cell, and the configuration information includes a cell list indicating the at least one cell managed by the base station.

(Supplementary Note 16)

The base station according to Supplementary Note 14, wherein the at least one particular cell is a subset of at least one cell that the RAN notification area consists of, and the configuration information indicates whether each cell within the RAN notification area is included in the at least one particular cell.

(Supplementary Note 17)

A method for a radio terminal, the method comprising:

controlling state transitions of the radio terminal among first to third RRC states; and if the radio terminal is in the second RRC state, if a current cell that the radio terminal has camped on is different from a first cell in which a state transition from the first RRC state to the second RRC state was performed, and if the current cell satisfies a predetermined condition, allowing the radio terminal to transmit data to be transmitted in the current cell by a first transmission procedure in which the radio terminal transmits uplink data before entering the first RRC state, wherein the first RRC state is a state in which the radio terminal and a radio access network (RAN) maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN.

(Supplementary Note 18)

A method for a base station placed in a Radio Access Network (RAN), the method comprising:

controlling state transitions of a radio terminal among first to third RRC states; and transmitting, to the radio terminal, configuration information indicating at least one particular cell in which the radio terminal in the second RRC state is allowed to perform a first transmission procedure in which the radio terminal transmits uplink data before entering the first RRC state, wherein the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN.

(Supplementary Note 19)

A program for causing a computer to perform a method for a radio terminal, wherein the method comprises:

controlling state transitions of the radio terminal among first to third RRC states; and if the radio terminal is in the second RRC state, if a current cell that the radio terminal has camped on is different from a first cell in which a state transition from the first RRC state to the second RRC state was performed, and if the current cell satisfies a predetermined condition, allowing the radio terminal to transmit data to be transmitted in the current cell by a first transmission procedure in which the radio terminal transmits uplink data before entering the first RRC state, wherein the first RRC state is a state in which the radio terminal and a radio access network (RAN) maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN, the third RRC state is a state in which the radio terminal and the RAN have released the AS context and in which the location of the radio terminal is not known to the RAN.

(Supplementary Note 20)

A program for causing a computer to perform a method for a base station placed in a Radio Access Network (RAN), wherein the method comprises:

controlling state transitions of a radio terminal among first to third RRC states; and transmitting, to the radio terminal, configuration information indicating at least one particular cell in which the radio terminal in the second RRC state is allowed to perform a first transmission procedure in which the radio terminal transmits uplink data before entering the first RRC state, wherein the first RRC state is a state in which the radio terminal and the RAN maintain an access stratum (AS) context and in which a location of the radio terminal is known to the RAN at cell level, the second RRC state is a state in which the radio terminal and the RAN maintain at least part of the AS context and in which the location of the radio terminal is known to the RAN at RAN notification area level configured by the RAN,
the third RRC state is a state in which the radio terminal and the RAN have released the AS context and in which the location of the radio terminal is not known to the RAN.

REFERENCE SIGNS LIST 1 gNodeB (gNB)
2 User Equipment (UE)
3 5G Radio Access Network (5G-RAN)
4 5G Core Network (5G-CN)
11 Cell
1101 RF Transceiver
1104 Processor
1105 Memory
1201 RF Transceiver
1203 Baseband Processor
1204 Application Processor
1206 Memory

The invention claimed is:

1. A radio terminal comprising:
a transceiver; and
at least one processor configured to control the transceiver, wherein
the at least one processor is configured to control state transitions of the radio terminal among RRC_CONNECTED, RRC_INACTIVE, and RRC_IDLE states;
the at least one processor is further configured to support data transmission in the RRC_INACTIVE state, and
the at least one processor is further configured to, in a case where the radio terminal is in the RRC_INACTIVE state, a current cell that the radio terminal has camped on is different from a first cell in which a state transition from the RRC_CONNECTED state to the RRC_INACTIVE state was performed, and the current cell satisfies a first condition, allow the radio terminal to perform data transmission in the current cell before transitioning to the RRC_CONNECTED state.

2. The radio terminal according to claim 1, wherein a first base station controlling the first cell is different from a second base station controlling the current cell.

3. The radio terminal according to claim 1, wherein
the first condition is that the current cell is in a RAN notification area received in the first cell, and
the at least one processor is configured to:
  in a case where the radio terminal is in the RRC_INACTIVE state, the current cell is different from the first cell, and the current cell does not satisfy the first condition, perform an update procedure of the RAN notification area; and
  in a case where data to be transmitted in the RRC_INACTIVE state occurs after the RAN notification area update procedure is completed, allow the radio terminal to perform data transmission in the current cell before transitioning to the RRC_CONNECTED state.

4. The radio terminal according to claim 1, wherein
the first condition is that the current cell is in a RAN notification area received in the first cell, and
the at least one processor is configured to:
  in a case where the radio terminal is in the RRC_INACTIVE state, the current cell is different from the first cell, the current cell does not satisfy the first condition, and an update procedure of the RAN notification area has not been performed, allow the radio terminal to perform the update procedure with the RAN;
  in a case where the radio terminal is instructed by the RAN in the update procedure to remain in the RRC_INACTIVE state, allow the radio terminal to perform data transmission in the current cell before transitioning to the RRC_CONNECTED state; and
  in a case where the radio terminal is instructed by the RAN in the update procedure to transition to the RRC_CONNECTED state, allow the radio terminal to perform data transmission in the current cell after transitioning to the RRC_CONNECTED state.

5. A method for a radio terminal, the method comprising:
controlling state transitions of the radio terminal among RRC_CONNECTED, RRC_INACTIVE, and RRC_IDLE states; and
supporting data transmission in the RRC_INACTIVE state, and
in a case where the radio terminal is in the RRC_INACTIVE state, a current cell that the radio terminal has camped on is different from a first cell in which a state transition from the RRC_CONNECTED state to the RRC_INACTIVE state was performed, and the current cell satisfies a first condition, allowing the radio terminal to perform data transmission in the current cell before transitioning to the RRC_CONNECTED state.

6. The method according to claim 5, wherein a first base station controlling the first cell is different from a second base station controlling the current cell.

7. The method according to claim 5, wherein
the first condition is that the current cell is in a RAN notification area received in the first cell, and
the method further comprises:
  in a case where the radio terminal is in the RRC_INACTIVE state, the current cell is different from the first cell, and the current cell does not satisfy the first condition, performing an update procedure of the RAN notification area; and
  in a case where data to be transmitted in the RRC_INACTIVE state occurs after the RAN notification area update procedure is completed, allowing the radio terminal to perform data transmission in the current cell before transitioning to the RRC_CONNECTED state.

8. The method according to claim 5, wherein
the first condition is that the current cell is in a RAN notification area received in the first cell, and
the method further comprises:
  in a case where the radio terminal is in the RRC_INACTIVE state, the current cell is different from the first cell, the current cell does not satisfy the first condition, and an update procedure of the RAN notification area has not been performed, allowing the radio terminal to perform the update procedure with the RAN;
  in a case where the radio terminal is instructed by the RAN in the update procedure to remain in the RRC_INACTIVE state, allowing the radio terminal to perform data transmission in the current cell before transitioning to the RRC_CONNECTED state; and
  in a case where the radio terminal is instructed by the RAN in the update procedure to transition to the RRC_CONNECTED state, allowing the radio terminal to perform data transmission in the current cell after transitioning to the RRC_CONNECTED state.

9. A method of a User Equipment (UE), the method comprising:
  receiving, from a network, system information including configuration information for small data transmission in an RRC_INACTIVE state; and
  determining, based on a plurality of conditions, whether to perform the small data transmission,
  wherein the plurality of conditions includes a first condition related to a serving cell,
  wherein the plurality of conditions includes a second condition related to a data volume threshold included in the system information, and
  wherein the second condition is that a data volume of pending uplink data for the small data transmission is less than or equal to the data volume threshold.

10. The method according to claim 9, further comprising:
  supporting an RRC_IDLE state, the RRC_INACTIVE state, and an RRC_CONNECTED state.

11. A method of a User Equipment (UE), the method comprising:
  receiving, from a network, system information including configuration information for small data transmission in an RRC_INACTIVE state;
  determining, based on a plurality of conditions, whether to perform the small data transmission;
  triggering an update procedure of a RAN-based Notification Area (RNA); and
  initiating the small data transmission in a cell of the RNA,
  wherein the plurality of conditions includes a first condition related to a serving cell, and
  wherein the plurality of conditions includes a second condition related to a data volume threshold included in the system information.

* * * * *